United States Patent [19]

Collineau

[11] 3,737,633

[45] June 5, 1973

[54] PULSE COUNT CORRECTION METHOD AND APPARATUS

[75] Inventor: Claude Jean Collineau, Epinay sur Seine, France

[73] Assignee: Coulter Electronics, Inc., Hialeah, Fla.

[22] Filed: May 7, 1971

[21] Appl. No.: 141,224

[30] Foreign Application Priority Data

May 20, 1970 France ................................7018222

[52] U.S. Cl. .........235/92 PL, 235/92 R, 235/92 FQ, 340/347 AD, 235/92 CA

[51] Int. Cl. ..............................................H03k 21/30

[58] Field of Search .....................235/92 CA, 92 NT, 235/92 FQ, 92 PC, 92 PL; 340/347 AD

[56] References Cited

UNITED STATES PATENTS

| | | | |
|---|---|---|---|
| 3,209,130 | 9/1965 | Schmidt | 235/92 PL |
| 3,586,835 | 6/1971 | Foeh | 235/92 PL |
| 3,445,840 | 5/1969 | Carlstead | 235/92 PL |
| 2,886,243 | 5/1959 | Sprague et al. | 340/347 |
| 3,349,390 | 10/1967 | Glassman | 340/347 |

*Primary Examiner*—Daryl W. Cook
*Assistant Examiner*—Joseph M. Thesz, Jr.
*Attorney*—Silverman & Cass

[57] ABSTRACT

By comparing the voltage analog of the mean frequency of a part of a small pulse sample of a pulse train with each of a plurality of voltages that define a predetermined law, such as particle coincidence in a Coulter type of electronic particle analyzer, count correction pulses are derived for each pulse sample and are then added thereto to eliminate counting errors.

26 Claims, 5 Drawing Figures

INVENTOR
CLAUDE JEAN COLLINEAU
BY Silverman & Cass
ATTYS.

PULSE COUNT CORRECTION METHOD AND APPARATUS

This invention relates to the study of physical phenomena whose characteristics are expressed in the form of pulses. The invention concerns, in particular, the study of liquid substances having therein particles in suspension. The number of these particles reveals properties of the substance which are to be analyzed. It will be understood that the invention is applicable generally to the study of pulse phenomena.

More particularly, the invention relates to the study of such phenomena by the counting of pulses generated by particles passing through a detector which should deliver, as a rule, one pulse per particle. The pulses thus produced and counted result in an output value affording information about the physical characteristics of the phenomenon studied.

Now well known in the art of electronic particle counting and analyzing is apparatus marketed under the trademark "Coulter Counter." Such apparatus and portions thereof are disclosed in several United States Pat. Nos., for example 2,656,508; 2,985,830; and 3,259,842. A significantly important portion of such apparatus is the minute scanning aperture or scanning ambit relative to or through which pass and are detected single particles at a rate often well in excess of one thousand per second. Because of the physical parameters of the scanning aperture, particles, rate of flow, etc., frequently there results the coincidence of two particles in the scanning ambit. As a result, there effectively is scanner and detected only one particle, not two.

In some cases, and in particular when there is to be studied a liquid substance having a number of particles in suspension, for example blood, it is possible to establish a law which takes into account the variation in the number of these coincidences in the course of a given counting process. This number can be expressed as a percentage of the total number of particles counted at the end of the counting process.

In French Pat. No. 1,582,131 there has been described a counting apparatus which counts with a statistic correction; whereby, it is possible to statistically modify, in accordance with a predetermined law, a series of pulses to correct a pulse count characterizing a haphazardly or irregularly recurring phenomenon. Such apparatus is of utility in the study of liquid substances including particles in suspension, the particles being counted with a correction for the coincident passages of the particles in a detector.

In the apparatus of the aforementioned patent, the corrections are effected at relatively long intervals of 1,000 counted pulses, so that if the counting of the particles is stopped within such an interval, the result obtained is incorrect, since the counting of the particles subsequent to the last correction is not subjected to a correction. Further, the rate of correction of the coincidences remains constant for a certain range of counting, for example, 200 corrections for the range of 40,000–80,000 pulses; whereas, in fact this rate should vary in a continuous manner. It is true that with the apparatus of the aforementioned patent it is possible to employ a shorter or smaller correcting interval, so as to improve the accuracy of the counting, but this improvement involves a substantial complication of the circuits employed.

The primary object of the present invention is to improve upon the prior art and to provide a process and a device with which the correction interval is very short and with which the rate of correction varies in accordance with a predetermined law as a function of certain external parameters which vary according to the physical conditions of the detecting procedure.

Accordingly, the invention provides a method for correcting the counting of a train of pulses, as a function of a predetermined law, such train of pulses having an irregular recurrence and expressing a pulse type physical phenomenon, said method comprising: periodically sampling the pulse train, dividing each sample into at least two sample parts, measuring the mean frequency of the pulses which form a first of said sample parts, comparing of the result of said mean frequency measurement with a signal permanently expressing said predetermined law, employing as a function of said comparison and during the sequence of the pulses corresponding to said second sample part a number of the pulses of said sequence as correction pulses so as to effect a correcting, and adding to said correction pulses the pulses of said train for forming a corrected count total.

The mean frequency of the pulses thus is measured periodically and furnishes an analog signal which exactly follows the variations in the physical phenomenon. Each subsequent one of such frequency measurement parts provides another measurement correction value and brings about a corresponding count modification of the train of pulses. Further, it is possible to effect a sampling at short intervals, for example 100 pulses, the count modification being made in the course of the last part of the sample, so that the measurement result is correct at the end of each short sample.

The invention further provides a device for correcting the counting of a train of pulses as a function of a predetermined law, such train of pulses having an irregular recurrence coming from a source of pulses and expressing a pulse type physical phenomenon, said device comprising: a sampling and control circuit connected to receive the train of pulses from said pulse source and including at least two outputs at which appear, respectively, signals which define consecutive sample parts of the pulse train which sample parts are established by said sampling and control circuit, a frequency meter connected to at least one of the outputs of said sampling and control circuit and adapted to deliver at its output an analog signal which is a function of the mean frequency of a corresponding series of pulses from a first sample part applied thereto, a regulating circuit for regulating the number of correcting pulses, said regulating circuit connected to the output of said frequency meter and to the second output of said sampling and control circuit for receiving a series of pulses corresponding to a second part of the sample, said regulating circuit comprising means for generating an analog signal permanently expressing said predetermined law and being adapted to make for each sample a comparison between the analog signal of the frequency meter and the analog signal of said generating means and thereupon to furnish a number of count correcting pulses as a function of said comparison, and an adding circuit connected to said pulse train source and to the output of said regulating circuit for adding together the pulses of said train of pulses and the correcting pulses of the regulating circuit, the output of said adding circuit constituting the output of said device.

The preferred embodiment of this invention will now be described, by way of example, with reference to the drawings accompanying this specification in which.

Figure 1:
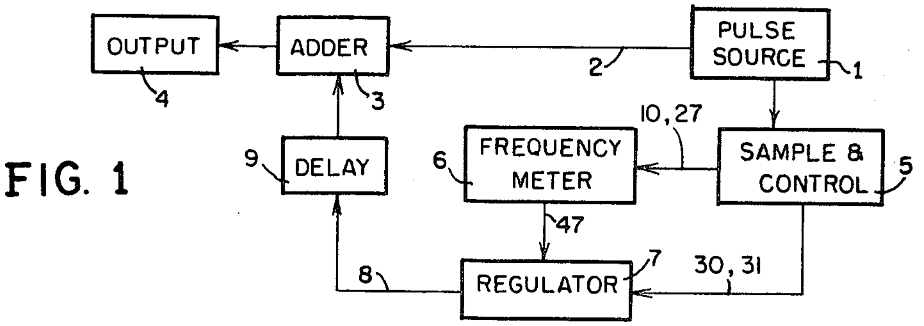
FIG. 1 is a simplified block diagram of a device according to the invention.

The train of pulses operated upon by this invention can be delivered by a pulse source constituted by permanent detectors, such as a Geiger-Muller tube, a photomultiplier tube, a particle counter, or the like. The specific example of the invention will be disclosed with reference to a particle detector of the Coulter type, such as taught in the above cited patents and comprising a tube having a calibrated aperture, through which pass particles in liquid suspension, for example blood cells in an electrically conductive solution. The modification of the train of pulses provided by this invention constitutes, in fact, a correction to the counting of the particles as a function of a statistic law, which takes into account the number of coincident passages of particles which occurs in the course of the counting of the particles as they pass through the aperture of the tube.

It is known that the coincidences due to the simultaneous passage of two particles through the aperture depend both on the degree of dilution, that is, the concentration of the particles in the liquid analyzed, and on the physical dimensions of the aperture. Further, it has been observed that these coincidences are independent of the speed of the passage through the aperture and the viscosity of the suspension. The rate of coincidences, that is, the percentage of coincidences relative to a given quantity of counted particles, is independent of the number counted and therefore independent of the volume analyzed, since the rate expresses a phenomenon which is permanent and constant throughout the measurement procedure. It has been ascertained that the law of variation which governs the rate of coincidences, if the latter does not exceed 10 percent of the particles counted, can be expressed in the following manner:

$$n = p(\bar{n}/1000)^2 \text{ in which} \quad (1)$$

$n$ = number of uncounted pulses,
$\bar{n}$ = number of counted pulses, and
$p$ = the coincidence factor;
and for a Coulter type of analyzing tube $$p = 2.5\ (d/100\ )^3 \times 500/V \text{ in which} \quad (2)$$

$d$ = diameter of the aperture in microns and
$V$ = volume of the manometer in microliters.

The invention is mainly based on the realization that the simultaneous passage of two or more particles, which, in the case of the detector of the Coulter type, is due to the concentration of the particles and to the dimensions of the aperture of the tube, can be likened to coincidences brought about by an apparent frequency, which is the mean frequency of the passage of the particles through the aperture. This apparent frequency can be measured at regular intervals and defines by sampling a value which permits detection of anomalies, in other words, the coincidences in the counting.

There is obtained:

$$F_a = \bar{n}/T \text{ in which} \quad (3)$$

$\bar{n}$ = number of particles in a volume, and
$T$ = time of passage of this volume through the aperture, i.e., the time to count $n$ particles.

Consequently, to determine the apparent frequency, it is sufficient to consider a sample of any number of pulses, for example one hundred pulses, and the time required to count that sample of pulses.

From the equations (1) and (2) it is possible to calculate the rate of coincidences which rate is written:

$$n/\bar{n} \text{ as a percentage. Thus} \quad (4)$$

$n = p\ (\bar{n}/1000)^2$ and for a Coulter type aperture tube,
$p = 2.5\ (d/100)^3 \times 500/V$ ;
$n = 2.5\ (d^3/10^6) \times (500/V) \times (\bar{n}^2/10^6) = (12.5/10^{10}) \times (d^3/V) \times \bar{n}^2$;
and $n/\bar{n} = (12.5/10^{10}) \times (d^3/V)\ \bar{n}$.

From equation (3) the coincidence rate is derived:

$$n/\bar{n} = (12.5/10^{10}) \times (d^3/V) \times FaT. \quad (5)$$

The terms $d$, $V$ and $T$ are constants for given conditions of measurement. Consequently $$kFa = \text{coincidence rate.} \quad (6)$$

Thus the rate of coincidences, in the particular case of a Coulter type particle detecting aperture tube, undergoes a linear variation as a function of the apparent frequency during the counting process. It is this relation which is used in the process and the device according to the present invention for regulating the flow or number of pulses through the regulating circuit, the apparent frequency being measured by a frequency meter in the course of each sample established during the counting process.

In the illustrated embodiment, the device according to the invention is employed in the special case in which pulses having a haphazard or irregular recurrence from a particle detector of the Coulter type are counted with a correction which is a function of the above discussed predetermined law, and is governed by the variation of the rate of coincidences which might occur in the course of the detection of the particles. This device comprises, as a pulse source 1, a particle detector furnishing to a line 2 a train of pulses having a haphazard or irregular recurrence. The train of pulses on the line 2 is applied directly to an adding circuit 3, which is connected to an output device 4 of any conventional type. The train of pulses furnished by the detector 1 also is applied to a sampling and control circuit 5, which is connected to a frequency meter 6 that is adapted to measure the apparent frequency of the pulses furnished by the detector 1. Both the frequency meter 6 and the sample and control circuit 5 have outputs coupled to a regulating circuit 7 for regulating the number of count correcting pulses. An output line 8 of the regulating circuit 7 is connected through a delay circuit 9 to the adding circuit 3, in which the number of correction pulses are added to the pulse train which comes directly from the detector on the line 2.

The number of correction pulses is a direct ratio of the coincidence rate; hence, the adding process can be repeated in accordance with a predetermined cycle. In the present embodiment and by way of example, this cycle has been chosen to be repeated each 100 pulses. In other words, for every 100 pulses delivered by the detector 1, the adding circuit 3 receives a number of correction pulses which is determined by both an analog voltage furnished by the frequency meter 6 and by a mathematic function or law which is built into the regulating circuit 7. The sampling and control circuit 5 divides the samples of 100 pulses into three parts or groups as follows:

0–19 . . . reset
20–89 . . . frequency measurement
90–99 . . . correction

It will be understood that this distribution of the parts is given by way of example and that some other arrangement could be adopted in accordance with the conditions of the measurement procedure and environment.

Figures 2, 3:
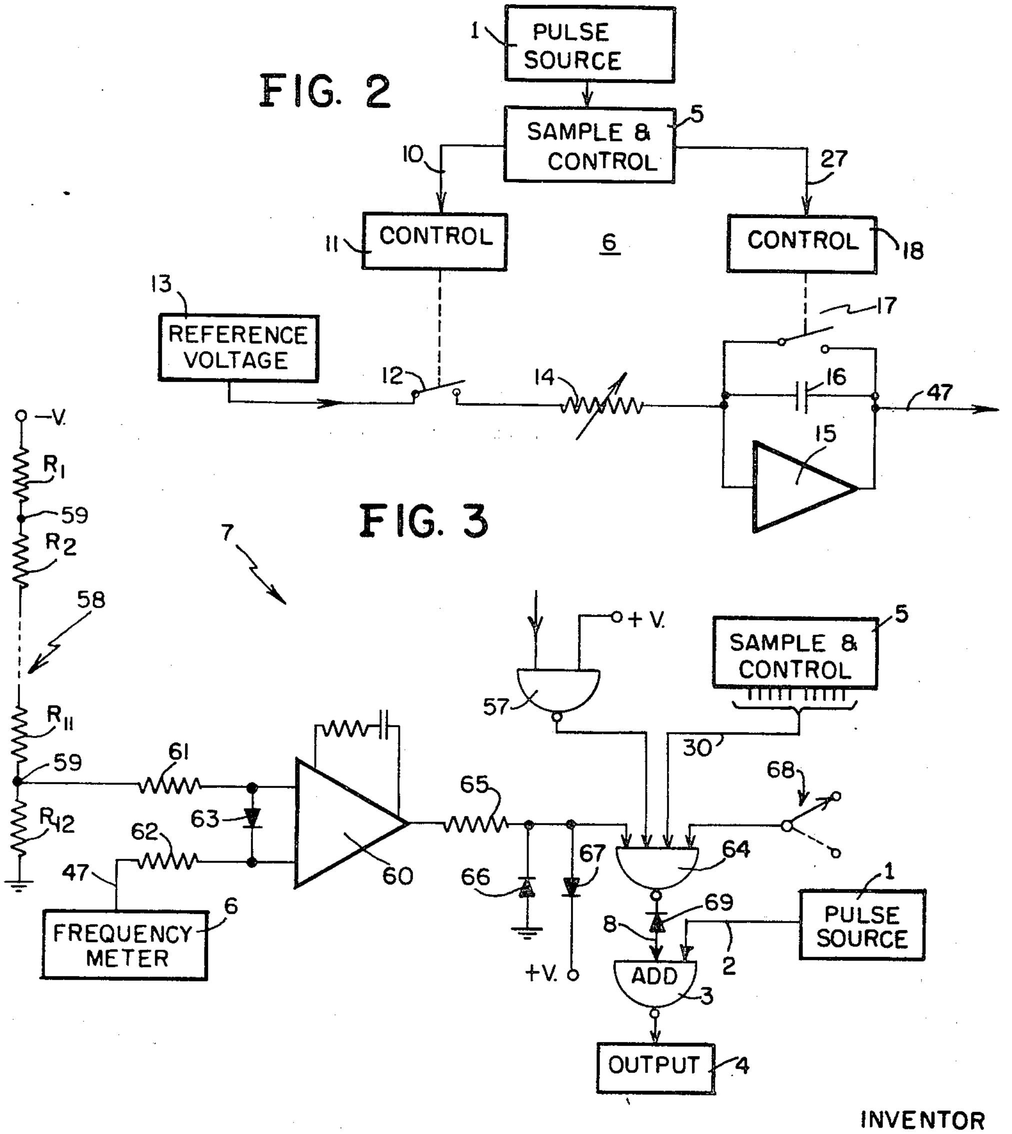
FIG. 2 is a block diagram detailing the frequency meter employed in the device shown in FIG. 1.
FIg. 3 is a partial diagram of the regulating circuit in the device shown in FIG. 1.

With reference to FIG. 2, the frequency meter 6 is to furnish an analog voltage which is a linear function of the frequency of recurrence of the pulses furnished by the detector 1. Because of control by the sampling circuit 5, the frequency meter 6 effects a frequency measurement only in the sample part corresponding to the pulses 20–89, periodically every 100 pulses delivered by the detector 1. For this purpose, the frequency meter 6 receives from the sampling circuit an enabling signal on a line 10, which signal is applied to a control circuit 11 of an electronic switch 12. The latter is connected to a reference source 13 which delivers an adjustable reference voltage. The switch 12 also is coupled to a variable resistor 14, for a purpose which will be disclosed later. The resistor 14 is connected to the input of an operational amplifier 15 that is arranged as an integrator with a capacitor 16 connected between its input and its output. The output of the amplifier 15 constitutes the output of the frequency meter, at which appears the analog voltage which is thereafter fed to the regulating circuit 7 and therein is employed for calculating the number of pulses to add in the adding circuit 3. The amplifier 15 can be shorted by an electronic switch 17, which is actuated for resetting during the sample part corresponding to pulses 0–19, by a control circuit 18, which receives a signal from the sampling and control circuit 5 in the course of the sample part corresponding to pulses 0–19.

Figure 4:
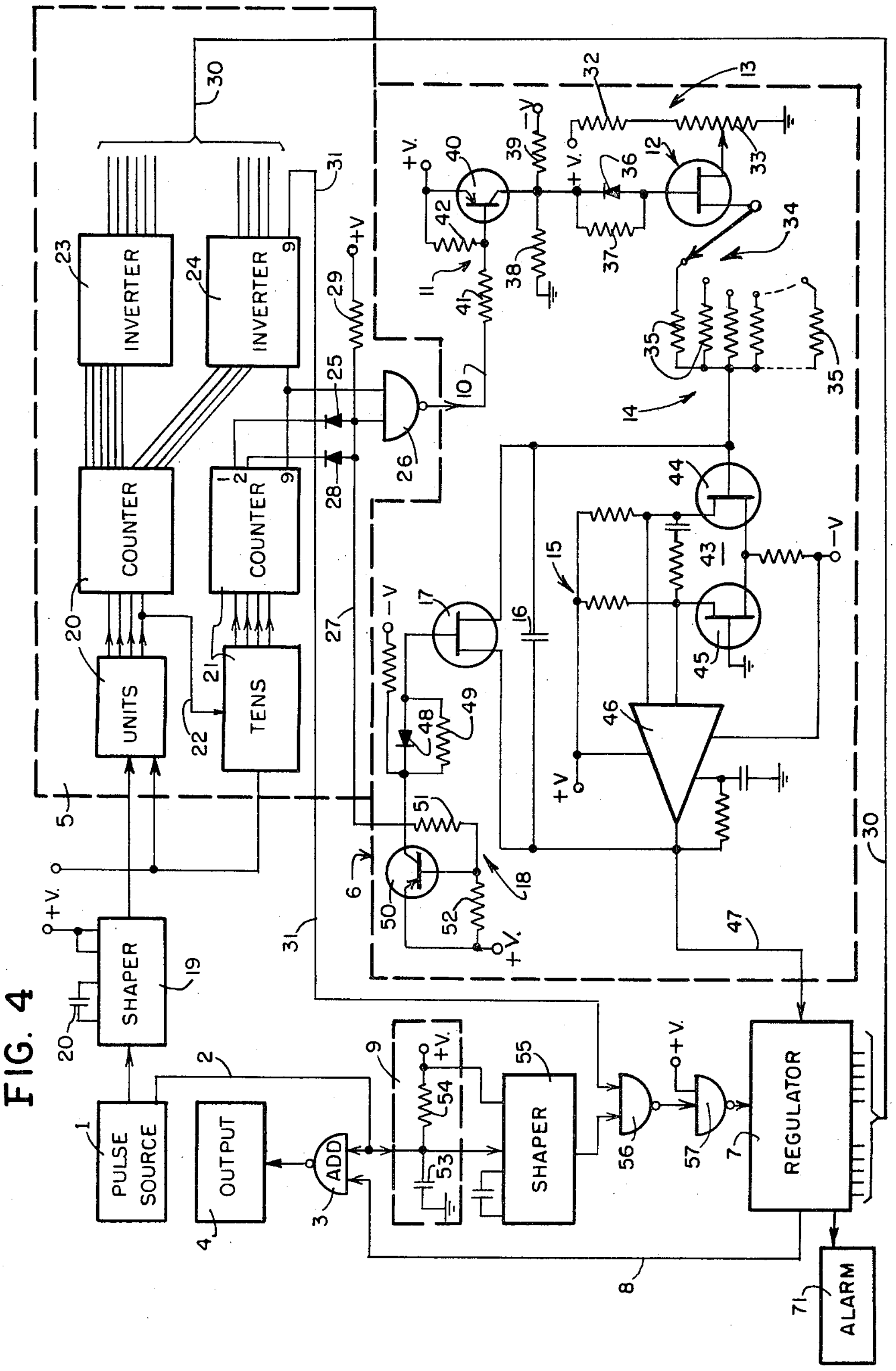
FIG. 4 is an electrical schematic diagram, in more detail, of the device according to the invention.

With reference to FIG. 4, the detector 1 is connected to a shaping circuit 19 which can include a monostable multivibrator, that gives to the pulses from the detector a given width of two microseconds, for example, due to the action of a capacitor 20 connected thereto. The output of the shaping circuit 19 is applied to the sampling and control circuit 5, which comprises two decade counters 20 and 21 of the conventional binary-coded decimal counting type. The counter 20 is for units and the other counter 21 is for tens. For tens carry purposes, units decade counter 20 is connected to the tens decade counter 21 through a conductor 22. The decade counter 20 comprises ten outputs which are respectively connected to two inverting circuits 23 and 24 each of which comprises six channels. The inverter circuit 23 is utilized wholly but the inverter circuit 24 is utilized for only five channels. Of the outputs of the decade counter 21, only those numbered 1, 2 and 9 are employed for determining the aforementioned three sample parts or groups 0–19, 20–89 and 90–99 of each sample. The output 1 of the decade counter 21 is applied, through a diode 25, to the first input of a NAND gate 26 whose other input is directly connected to the output 9 of the same decade counter. The output 2 of the latter is connected to a line 27 through a diode 28. The anodes of the diodes 25 and 28 are connected to a positive voltage source through a resistor 29. The outputs of the inverting circuits 23 and 24, except for the 9 line, are united in a cable 30, which is connected to the regulating circuit 7. The last output of the circuit 24 is connected to a line 31, which is gated into the regulator 7, as will be discussed subsequently.

The reference voltage source 13 of the frequency meter 6 is formed by a series connection, between a stabilized positive voltage source +V and ground, of a resistor 32 and a potentiometer 33, the sliding contact of which is connected to the drain of a field effect transistor 12 which performs the function of the switch 12 shown in FIG. 2. The source of this field effect transistor 12 is connected by a switch 34 to one of a plurality of regulating resistors 35 having distinct values and which define the variable resistor 14. The gate of the field effect transistor 12 is connected to a diode 36, which is shunted by a resistor 37, and the cathode of the diode 36 is connected to a voltage divider formed by a resistor 38 connected to ground and a resistor 39 connected to a negative voltage source −V. The junction of the resistors 38 and 39 is connected to the collector of a transistor 40, which is part of the control circuit 11. The emitter of the transistor 40 is connected to a positive voltage source +V and its base is connected to a resistor 41, which is connected to the conductor 10 and to a resistor 42 which is connected to the positive voltage source +V.

The junction point of the resistors 35 is connected to the amplifier 15, which comprises a differential voltage amplifier 43 that is formed by two field effect transistors 44 and 45, the two outputs of which are applied to an operational amplifier 46. The capacitor 16 is connected to the input of the differential voltage amplifier 43 and to the output of the operational amplifier 46. The output analog signal of the frequency meter 6 appears on a line 47, which is connected to one of the inputs of the regulating circuit 7.

The capacitor 16 is shunted by the drain-source circuit of a field effect transistor 17 which forms the switch 17 shown in FIG. 2. The gate of this transistor is coupled to the junction of the anode of a diode 48 and a parallel connected resistor 49. The other terminal of this resistor and the cathode of this diode is connected to a negative voltage source −V and to the collector of a transistor 50, which is part of the control circuit 18. The base of the transistor 50 is connected to the line 27 of the sample control circuit 5 through a resistor 51, and to a positive voltage source +V through a resistor 52. The emitter of the transistor 50 also is connected to this source +V.

The pulses furnished by the detector 1 appear on the conductor 2 and are introduced into the delay circuit 9, which is formed by a series connection, between a positive voltage source +V and ground, of a capacitor 53 and a resistor 54, the junction between which is connected to one of the inputs of the adding circuit 3, which is formed by a NAND gate 3. The other input of this adding circuit is connected to the output of the regulating circuit 7 through the line 8.

The delay circuit 9 is designed to give a delay of two microseconds to the pulses applied thereto. The delayed pulses are applied, after having been shaped in a circuit 55 that is similar to the shaping circuit 19, to one of the inputs of a NAND gate 56, which receives at its other input the signal in the line 31 coming from the 9 value line from the inverter 24 of the sampling and control circuit 5. The output of the gate 56 is applied to an inverting gate 57, which receives a positive voltage and whose output is applied to the regulating circuit 7.

The regulating circuit 7 now will be described with reference to FIGS. 3 and 5. This circuit comprises ten parallel and identical channels only one of which is shown in FIG. 3. In FIG. 3, a voltage divider 58 is connected between ground and a negative voltage supply −V. The junctions 59 of resistors $R_1$ to $R_{12}$ of the divider are connected, respectively, to the various channels of the circuit. Each junction point 59 of the voltage divider is connected to one of the inputs of an operational amplifier 60 through a resistor 61. The other input of this amplifier is connected to the output of the frequency meter 6, through a resistor 62, and these two inputs are connected to each other through a diode 63. The output of the operational amplifier 60 is connected to one of four inputs of a NAND gate 64 through a resistor 65. This same input is connected to ground through a diode 66 and to a positive supply +V through a diode 67. A second input to the gate 64 is connected to the gate 57, a third is connected by the cable 30 to control circuit 5, and the fourth input is connected to a control switch 68, whereby the device can be made to operate with or without counting correction. The output of the gate 64 is connected to the adding circuit 3 through a diode 69.

Figure 5:
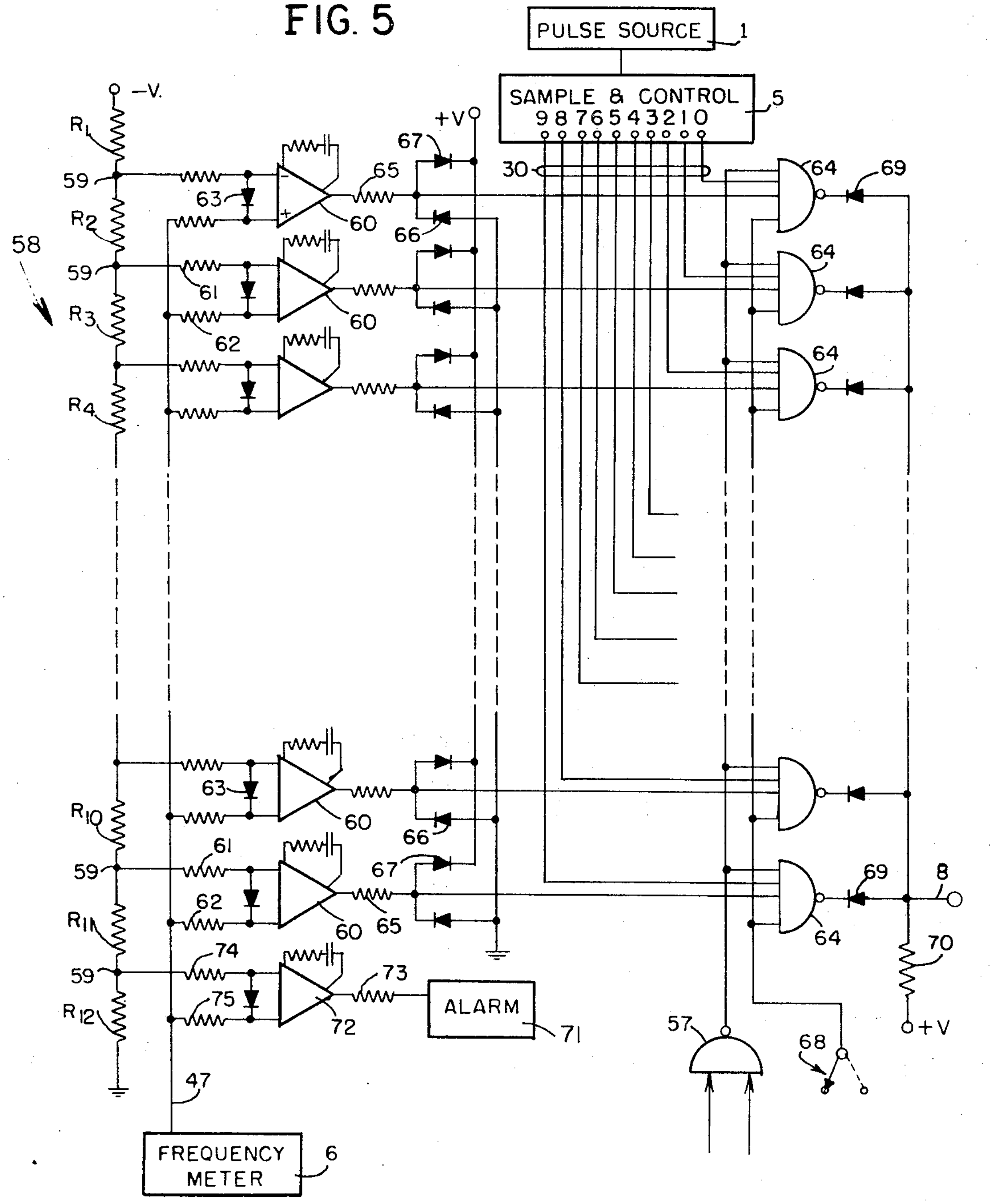
FIG. 5 is a diagram in detail of the regulating circuit shown in FIG. 3.

As can be seen in FIG. 5, the outputs of the ten NAND gates 64 of the ten channels of the circuit 7 are connected to each other and to a supply +V through a resistor 70, and output pulses are applied to the output line 8.

The resistor $R_{12}$ of the voltage divider 58 is connected to ground and is coupled to an alarm circuit 71 by way of the output of an amplifier 72 through a resistor 73. The inputs of the amplifier 72 are connected through resistors 74 and 75, respectively, to the line 47 that forms the output of the frequency meter 6 and to the junction of the resistors $R_{11}$ and $R_{12}$ of the voltage divider 58.

This device, according to the preferred embodiment, operates in the following manner:

The sampling and frequency control circuit 5, receives the particle-related pulses coming from the detector 1 and cyclically takes samples of 100 pulses. Each sample is divided into three sample parts or groups. The outputs 1, 2 and 9 of the tens decade counter 21 are employed for this purpose. During the first part of the sample, that is the resetting part between pules 1 and 19, a signal at the outputs 1, 2 of the decade counter 21 is applied to the line 27, turns on the transistor 50 and consequently turns on the transistor 17 which short circuits the amplifier 15 of the frequency meter 6. The gate 26 remains "false" or closed and the capacitor 16 is discharged. During the following part or group of pulses, that is, between the 20th and the 89th pulse, the gate 26 transmits a "true" output signal in line 10. This output signal turns on the transistor 40 which turns on the transistor 12 that forms the switch 12. Turning on of the transistor 12 applies the reference voltage, coming from the reference source 13 through one of the resistors 35, to the circuit comprising the amplifier 15 and the capacitor 16, the latter thus being charged for the period during which the switch 12 is closed.

This frequency meter circuit 6 thus delivers a voltage to the line 47 which is proportional to the time between the 20th pulse and the 89th pulse. This analog voltage is inversely proportional to the apparent frequency of the pulses furnished by the detector 1, which is clear from the following expression:

$$Vs=\frac{1}{RC}\int_0^T Vdt;\ Vs=\frac{1}{RC}VT,\ \text{with}\ V=c^t \qquad (7)$$

in which:

- $T$ = the interval of time between the 20th and the 89th pulse;
- $V$ = is a constant regulated by the potentiometer 33, the latter being adjustable as a function of the physical parameters of the detector 1;
- $Vs$ = the expression of the time in voltage between the 20th and the 89th pulse, in other words, $Vs$ is the analog of the counting time of a sample of 100 counted pulses; and
- $1/RC$ is an integration constant which can be regulated by the position of the switch 34, and the position of which depends on the physical parameters of the detector 1.

If a Coulter type counter is employed for the detector 1, the potentiometer 33 enables the device to be regulated as a function of the pressure applied to the manometer and of the viscosity of the liquid analyzed. The switch 34 choses an integration constant, depending on the diameter of the aperture of the aperture tube of the detector.

As soon as a signal appears at the 9th output of the decade counter 21, the gate 26 is closed again, the switch 12 opens to stop the operation of the frequency meter 6 which holds the analog signal it just established. The 90th signal is inverted by the inverter 24 and is applied to the gate 56, authorizing it to pass pulses coming from the shaping circuit 55, which delivers pulses delayed relative to those coming from the detector 1. The output signal of the gate 56 is inverted in the gate 57 and applied to the regulating circuit 7. The latter then effects a comparison between the value of the output voltage of the frequency meter 6 and a reference analog voltage which is established by the voltage divider 58, as a function of the correction law. In this manner, the correction rate, i.e., the number of correction pulses to be added per 100 counted pulses, varies according to the law explained hereinbefore: $T=kF$ or $T = k/V_s$ in which $V_s$ is the output voltage of the frequency meter 6.

Each of the 10 channels of the regulating circuit 7 corresponds to one of ten correcting rates, which provides from zero to ten correction pulses for each sample of 100 pulses counted.

Each NAND gate 64, see FIG. 5, is considered "true" if its four inputs are at 1 level and is "false" if any one of its inputs is at 0 level. When a NAND gate 64 is true, a pulse is established on the line 8. A first input of each gate 64 can be at 1 level if a signal appears in the line 31, that is, between 90 and 99 pulses. A second input is at 1 level when a signal is applied thereto through any one of the outputs of the inverting circuits 23 or 24 by the cable 30. In other words, the pulses 90–99 can provide, in succession, one to 10 pulses through the gates 64. The level of the third input of each of the gates 64 depends on the voltage from the frequency meter 6. This voltage is applied to the resistors 62 and is compared with the voltages which are furnished at the junction points 59 of the resistors $R_1$ to $R_{12}$ of the divider 58. The values of these resistors are chosen so that the successive voltage values at these junction points 59 conform to the law $T = k/V_s$, that is a hyperbolic curve. The fourth input to each gate 64 is at the 1 level while the switch 68 is in the coincidence correction position.

Accordingly, the input to each amplifier 60 from its junction point 59 is brought to a definite potential corresponding to a point on the hyperbolic curve or to a given correction rate, and the other input to each amplifier 60 is subjected to the potential appearing on the line 47. The resistors 61 and 62 have identical values. In order to increase the definition of its point of equilibrium, each amplifier 60 is connected as an open loop. Consequently, when the frequency meter 6 delivers a voltage lower than a given voltage on the divider 58, the divider input of the respective amplifier, which corresponds to the point of the divider at which this given voltage is established, becomes dominant so that the amplifier delivers an output voltage which, after having been returned to the logic 1 level by the diode 67, is applied to the corresponding gate 64. If, on the other hand, the frequency meter 6 delivers a voltage higher than the voltage of a junction point of the divider 58, the frequency meter input is dominant and the amplifier 60 furnishes a negative voltage which is grounded through the diode 66. In this case, the corresponding gate 64 receives an 0 level and remains inhibited.

A correction cycle proceeds in the following manner for each sample.

Between the pulses 0 and 19, the frequency meter 6 is reset in the manner already described, and between the pulses 20–89 the measurement is carried out.

As soon as the 90th pulse appears, the gate 56 is enabled by the signal on the line 31 and is opened each time that a delayed pulse is applied thereto from the delay circuit 9 and the shaping circuit 55. Consequently, the gate 57 delivers to the regulating circuit 7 a series of pulses delayed by 2 micro seconds relative to the pulses coming from the detector 1.

For example, assume that the frequency meter 6 previously has measured a frequency corresponding to a voltage $V_s$ lower than the voltage of the junction point between the resistors $R_6$ and $R_7$, which corresponds to a correction rate of 6, or a number of six pulses to be added to the pulses from the detector 1. Therefore, when the 90th pulse occurs, the first channel of the circuit 7 is opened, since the voltage of the frequency meter 6 is of lower value relative to the voltage at the junction 59 between the resistors $R_1$ and $R_2$. The frequency meter voltage also is less than the potentials established between the resistors $R_2 - R_3$, $R_3 - R_4$, $R_4 - R_5$, $R_5 - R_6$ and $R_6 - R_7$ so that the corresponding gates 64 in the first six channels are open. On the other hand, the voltage of the frequency meter 6 is higher than the voltage between the resistors $R_7$ and $R_8$; hence, the corresponding gate 64 in the remaining channels is closed.

Thus, the opening of each gate 64 causes a corresponding pulse to appear in line 8, which pulse is added after the 90th to 96th pulse delivered, respectively, by the detector 1, owing to the NAND gate of the adding circuit 3.

If the voltage furnished by the frequency meter 6 is lower than the potential between the resistors $R_{11}$ and $R_{12}$, which would require a correction of more than 10 pulses, the amplifier 72 causes an alarm to be set off through the alarm device 71.

An object of the device is to correct the count of the counted pulses with a precision of ±1 percent. It can be shown that the measurement of the apparent frequency can be carried out with a precision of 4 percent maximum, bearing in mind the errors introduced by the detector tube itself and by the associated apparatus. Moreover, the circuits employed in the device can at the most result in an error of ±5 percent. However, these errors of 4 percent and 5 percent intervene in the final result of the counting only to the extent of 0.4 percent and 0.5 percent respectively, since they concern only 10 per cent of the counted pulses (maximum correction rate). Thus it can be seen that the precision of ±1 per cent easily is achieved.

In experimentation with a detector and aperture tube of the Coulter type, having an aperture of 100 microns and in which the amount of liquid studied is 500 microliters, the voltage divider 58 resistances were calculated in the following manner:

Assuming that an apparent frequency affording 0.5 percent of coincidence error is made to correspond to a voltage of 10 volts, it being possible to calibrate this voltage by the regulating of the voltage divider 32, 33 and by the time constant of the circuit comprising the resistor 35 and capacitor 16, it is then possible to calculate by means of the function $F = k/Vs$ the voltages corresponding to the frequences bringing about a 1 percent, 2 percent, 3 percent . . . correction. As the precision must be at the most 1 percent in absolute value, it is necessary to choose the first step or stage of the correction rate to be 0.5 percent instead of 1 percent. The other steps can then be chosen 1.5 percent, 2.5 percent, 3.5 percent . . . By applying a voltage of 15 V to the voltage divider 58, it then is possible to calculate the values of the voltages and resistances in accordance with the following table:

| Divider Voltage (negative) | Rate of Correction % | Regulating Circuit Channel No. | Divider Resistance In Ohms | Individual Values of $R_1$ to $R_{12}$ In Ohms |
|---|---|---|---|---|
| 15 | 0 | 0 | 3000 | 1000 |
| 10 | 0.5 | 1 | 2000 | 1330 |
| 3.33 | 1.5 | 2 | 666 | 267 |
| 2 | 2.5 | 3 | 400 | 113 |
| 1.43 | 3.5 | 4 | 286 | 66.5 |
| 1.1 | 4.5 | 5 | 220 | 37.4 |
| 0.91 | 5.5 | 6 | 182 | 28 |
| 0.77 | 6.5 | 7 | 154 | 21 |
| 0.666 | 7.5 | 8 | 133.2 | 15.8 |
| 0.587 | 8.5 | 9 | 117.4 | 12.4 |
| 0.526 | 9.5 | 10 | 105.2 | 10 |

| | | | | |
|---|---|---|---|---|
| 0.480 | 10.5 | Alarm | 95.2 | 95 |

By way of example, the following components and logic circuits can be employed:

| | |
|---|---|
| Gates **3, 26, 56** and **57** | 7400 N |
| Shaping circuits **19** and **55** | SN 74121 N |
| Decade counters **20** and **21** | SN 749 N and SN 7442 N |
| Inverters **23** and **24** | SN 7404 N |
| Amplifier **46** | 809 CE |
| Amplifiers **60** and **72** | SCF 2709 CE |
| Gates **64** | SN 7420 N |
| Transistors **40** and **50** | 2 N 2905 A |
| Transistor **12** | U 1714 |
| Transistor **17** | 2 N 3821 |
| Amplifier **43** | 2 N 3957 |
| Diodes **25, 28, 36, 48, 63, 66, 67** and **69** | 1 N 4148 |
| Capacitor **16** | 1 micro |
| Capacitor **20** | 2200 pF |
| Capacitor **53** | 22 nF |
| Resistor **54** | 1 k |
| Resistor **29** | 33 k |
| Resistor **32** | 100 |
| Resistor **33** | 820 |
| Resistor **35** | 5 k to 100 k |
| Resistor **49** | 270 k |
| Resistors **51, 52** | 10 k |
| Resistors **61, 62** | 40.2 k |
| Resistor **65** | 2.2 k |
| Resistor **70** | 33 k |

It is to be understood that the scope of the invention is not intended to be limited to the foregoing detailed description with respect to the specific law which is incorporated in the voltage divider 58. Indeed, it will be understood that the values of the resistances $R_1$ to $R_{12}$ can be so chosen that some other law and its curve is incorporated therein.

What it is desired to secure by Letters Patent of the United States is:

1. A method for correcting the counting of a train of pulses, as a function of a predetermined law, such train of pulses having an irregular recurrence and expressing a pulse type physical phenomenon, said method comprising: periodically sampling the pulse train, dividing each sample into at least two sample parts, measuring the mean frequency of the pulses which form a first of said sample parts, comparing of the result of said mean frequency measurement with a signal permanently expressing said predetermined law, selecting, during the sequence of the pulses corresponding to said second sample part and as a function of said comparison, a number of the pulses of said sequence as count correcting pulses, and adding to said correcting pulses the pulses of said train of pulses for forming a corrected count total.

2. The method as defined in claim 1 further comprising: delaying the pulses employed as correcting pulses for a predetermined period prior to said adding with respect to the pulses of said pulse train.

3. The method as defined in claim 1 in which said dividing of said sample forms a third sample part, and said method further comprises the cancelling of the result of said frequency measurement during said third sample part.

4. The method as defined in claim 3 in which said periodic sampling defines continuous samples from the train of pulses, with said third sample part of one such pulse sample being interposed between the second sample part of a preceding sample and the first sample part of said one such pulse sample.

5. The method as defined in claim 4 in which said sampling and dividing are accomplished by a digitalized processing of each pulse of said train of pulses.

6. The method as defined in claim 1 wherein said mean frequency measurement is accomplished by integration of a reference voltage.

7. The method as defined in claim 6 further comprising: generating said train of pulses for purpose of counting particles in a fluid suspension, and in which said reference voltage is made adjustable, such that said integration is independent of any fluid pressure and viscosity parameters of the particle suspension.

8. The method as defined in claim 7 in which the particles in suspension are detected by means of an aperture tube of the Coulter type, and the voltage to be integrated is made adjustable and proportional to the diameter of the aperture of the aperture tube.

9. The method as defined in claim 1 in which said predetermined law is defined by a plurality of discrete voltage values, each representing a different digit value of correcting pulses.

10. The method as defined in claim 9 in which said plurality of discrete voltage values relate to a hyperbolic curve.

11. The method as defined in claim 10 in which said hyperbolic curve represents the occurrence of particle coincidence in a particle detector of the Coulter type.

12. A device for correcting the counting of a train of pulses as a function of a predetermined law, such train of pulses having an irregular recurrence coming from a source of pulses and expressing a pulse type physical phenomenon, said device comprising: a sampling and control circuit connected to receive a train of irregularly recurring pulses and including means which define at least two sample parts of the pulse train, which sample parts are provided at outputs established by said sampling and control circuit; a frequency meter connected to said sampling and control circuit for receiving a first sample part and for delivering at its output an analog signal which is a function of the mean frequency of the series of pulses from that first sample part; a regulating circuit connected to receive the analog signal output of said frequency meter and having means for generating an analog signal permanently expressing said predetermined law and means to make for each pulse sample a comparison between the analog signal from the frequency meter and the analog signal expressing said law, and thereupon to furnish a number of count correcting pulses as a function of said comparison; and an adding circuit connected to said pulse train source and to the output of said regulating circuit for adding together the pulses of said train of pulses and the correcting pulses from the regulating circuit, the output of said adding circuit forming the output of said device.

13. The device as defined in claim 12 in which said sampling and control circuit is coupled to deliver to said regulating circuit a series of pulses corresponding to a second sample part, and said regulating circuit includes circuitry utilizing said second sample part pulses for generating said correcting pulses.

14. The device as defined in claim 13 which further comprises a delay circuit coupled to the regulating circuit for delaying the receipt by the adding circuit of the correcting pulses, whereby the pulses of said second sample part can be added digitally to the correcting pulses which originate from pulses of said second sample part.

15. The device as defined in claim 12 in which said sampling and control circuit includes means for forming a third sample part, and said frequency meter includes reset means responsive to the receipt of said third sample part for resetting said frequency meter to eliminate its analog signal output value.

16. The device as defined in claim 15 in which said sampling and control circuit is constructed and arranged to operate cyclically, such that the pulse train is divided into equal and continuous samples, and in which said third sample part of one sample precedes the first sample part of that sample.

17. The device as defined in claim 12 in which said sampling and control circuit includes digitalized pulse count decoding and gating circuitry which receives the train of pulses and cyclically divides it into pulse samples of equal size and divides each sample into first, second and third sample parts, the cyclic operation being arranged to define especially small samples with respect to the number of such samples.

18. The device as defined in claim 12 in which said frequency meter comprises an integrator coupled to a source of reference voltage by way of a first switch that is closed by control from said sampling and control circuit during said first sample part.

19. The device as defined in claim 18 in which said frequency meter further comprises a discharge path that includes a second switch which shunts said integrator, and said second switch is closed for reset purposes by said sampling and control circuit, subsequent to said first sample part.

20. The device as defined in claim 18 which further comprises means for generating the train of pulses in a manner which is related to the counting of particles in a fluid suspension, there being one pulse for each particle, said frequency meter including first circuitry for adjusting the reference voltage, as seen by the integrator, to cause integration to be independent of the parameters of fluid pressure and viscosity of the particle suspension.

21. The device as defined in claim 20 in which said pulse generating means comprises a particle detector of the Coulter type, having an aperture tube, and said frequency meter further includes second circuitry for adjusting the reference voltage, as seen by the integrator, to cause integration to be independent of the diameter of the aperture of said aperture tube.

22. The device as defined in claim 12 in which said regulating circuit includes means for defining a plurality of discrete voltage values which values, taken as a group, express said predetermined law.

23. The device as defined in claim 22 in which said voltage means is arranged to define a group of voltage values which express the mathematic parameters of a hyperbolic curve which is representative of said predetermined law.

24. The device as defined in claim 22 in which the predetermined law expressed by said voltage defining means represents a law of occurrence of particle coincidence in a particle detector of the Coulter type.

25. The device as defined in claim 22 in which each said discrete voltage value is electrically associated with a different correcting pulse data processing channel, and each said channel includes a comparator element having as one input its associated discrete voltage value, all said comparator elements comprising said comparison means.

26. The device as defined in claim 25 in which each data processing channel terminates with a gate that is responsive to its comparator element in the manner that, when said comparator element is dominated by its discrete voltage value rather than the analog value from said frequency meter, a correcting pulse is generated by said channel and passes from said gate for ultimate receipt by said adding circuit, the number of such dominated gates for any one pulse sample determining the number of correcting pulses generated for such sample.

* * * * *